United States Patent [19]

Shorey

[11] Patent Number: 5,097,565
[45] Date of Patent: Mar. 24, 1992

[54] CARGO CASTER BEARING ASSEMBLY

[75] Inventor: Thomas H. Shorey, Mill Creek, Wash.

[73] Assignee: The Boeing Company, Seattle, Wash.

[21] Appl. No.: 438,723

[22] Filed: Nov. 17, 1989

[51] Int. Cl.⁵ .............. A47B 91/00; B60B 33/00; F16C 43/06; F16C 33/76

[52] U.S. Cl. .................................. 16/48; 16/20; 384/508; 384/607

[58] Field of Search ............. 16/20, 48; 384/508, 384/607, 94, 96

[56] References Cited

U.S. PATENT DOCUMENTS

| | | |
|---|---|---|
| 328,176 | 10/1885 | Bailey. |
| 734,194 | 4/1903 | Riebe. |
| 825,417 | 7/1906 | Rivett. |
| 1,174,541 | 3/1916 | Bernheim. |
| 1,775,803 | 9/1930 | Baut. |
| 3,148,922 | 9/1964 | Roessler, Jr.. |
| 3,508,293 | 4/1970 | Bosco ........................... 16/21 |
| 3,606,503 | 9/1971 | Asberg et al.. |
| 4,316,305 | 2/1982 | Seaford ........................ 16/21 |
| 4,429,925 | 2/1984 | Orain. |
| 4,445,791 | 5/1984 | Klima ........................... 384/96 |
| 4,554,704 | 11/1985 | Raffaeli ...................... 16/18 R |
| 4,568,205 | 2/1986 | Basener. |
| 4,648,727 | 3/1987 | O'Neil et al.. |
| 5,026,177 | 7/1991 | Masuda ...................... 384/508 |

FOREIGN PATENT DOCUMENTS

624888 8/1981 Switzerland .............. 16/20

Primary Examiner—Lowell A. Larson
Assistant Examiner—Carmine Cuda
Attorney, Agent, or Firm—Christensen, O'Connor, Johnson & Kindness

[57] ABSTRACT

A caster bearing assembly attachable to a surface for facilitating the movement of a body along a roller plane located above the surface. The caster bearing assembly (10) includes a base part (16) mounted to the surface, a top part (18), bearings (20), and a roller assembly (22). The bearings fit within a bearing raceway (24) formed by an outer race (42) in the base part and an inner race (56) in the top part, thereby allowing the top part to fully and freely move relative to the base part. The bearings are inserted into the bearing raceway through an opening (58) extending from an exposed surface (54) of the top part to the bearing raceway. The opening is then sealed with a plug (60) having an inner surface (62) substantially matching the inner race at which the opening terminates. The roller assembly is fixedly attached to the top part so that the orientation of its rollers (26) may be varied.

18 Claims, 5 Drawing Sheets

CARGO CASTER BEARING ASSEMBLY

TECHNICAL FIELD

This invention elates to bearing assemblies and, more specifically, to bearing assemblies particularly useful in casters.

BACKGROUND OF THE INVENTION

Casters are employed to facilitate the movement of heavy articles such as cargo within an airplane. The cargo casters in such an application contain rollers, or wheels, that provide a roller plane above the main cargo deck, along which the cargo travels. Such cargo casters significantly lessen the burden of loading and unloading the cargo.

Current cargo caster assemblies consist of a base, a ball bearing assembly, and a roller assembly. The base is mounted, either directly or indirectly, to the main cargo deck at appropriate positions. The ball bearing assembly is a pre-packaged unit, containing a ring of ball bearings captured between an inner race and an outer race that allows the races to freely move relative to each other. The ball bearing assembly is of circular design, such that its outer race is secured to an appropriately sized circular recess in the base. Its inner race is secured to the circular frame of the roller assembly, which includes rollers, or wheels, that are freely rotatable and have a contacting surface that creates a roller plane above the cargo caster assembly. Because the roller assembly is coupled to the base by the ball bearing assembly, the rollers are not only free to rotate, but their orientation may be changed by a full three hundred sixty degrees. This full range of orientation feature is required due to the various angles at which cargo must be moved during the loading and unloading process.

Current cargo caster assemblies allow dust and other contaminants to reach the bearing surfaces, thereby increasing the bearing resistance which impedes the free rotation of the roller assembly relative to the base. This directly translates to increased efforts required to move the cargo during loading and unloading. Currently, the only recourse to this accumulation of dust and other contaminants is to frequently replace the ball bearing assembly, or to attempt to clean the contaminants from the bearing surfaces. The latter process has not been successful in the past since the contaminants remain trapped within the materials used to lubricate the bearing surfaces.

The current design has also resulted in a ball bearing assembly that has not remained adequately secured to the base and the roller assembly. When the ball bearing assembly separates from either, the change of roller orientation feature is lost.

Because current ball bearing assemblies consist of steel ball bearings captured by steel inner and outer races, they are of significant weight. Given that hundreds of cargo caster assemblies are used in a single cargo airplane, their weight is of grave concern and it directly diminishes the amount of cargo that may safely be carried.

Ball bearing assemblies of steel construction are expensive to produce, and therefore current cargo caster assemblies utilizing them are similarly expensive to produce. Because the ball bearing assemblies currently being used frequently must be replaced due to fouling or separating, the repair and maintenance costs of current cargo caster assembles is also prohibitive.

The problems detailed above are not unique to cargo caster assembles, but are found in virtually any environment having two parts with an interfacing ball bearing requirement. Accordingly, there has been a long-felt need for a bearing assembly that is relatively inexpensive to produce and maintain, that significantly reduces fouling of the bearing surfaces by dust and other contaminants, and that, with respect to cargo caster assemblies, is of reduced weight and attaches to existing mounts. This invention is directed to satisfying this need.

SUMMARY OF THE INVENTION

In accordance with this invention, an assembly having two parts movable relative to one another, and a method of forming the assembly, are disclosed. The assembly includes a first part having a first race, a second part having a second race, and a plurality of bearings, wherein the races oppose each other to form a bearing raceway for receiving the bearings therein. The first and second parts have surfaces overlapping each other on opposite sides of the bearing raceway, while at least one of the parts has an exposed surface not overlapped by a surface of the other part. An opening extends from the exposed surface to one of the races, whereby bearings may be inserted through the opening into the bearing raceway. The assembly also includes means for closing the opening after the bearings have been inserted.

The method of the present invention comprises the steps of: (a) placing the first race formed in the first part in opposing position with the second race formed in the second part; (b) inserting the bearings into the bearing raceway through the opening; and (c) closing the opening after the bearings have been inserted with a plug having a leading surface substantially matching the race at which the opening terminates.

BRIEF DESCRIPTION OF THE DRAWINGS

The foregoing and other features and advantages of the present invention will become more readily appreciated as the same becomes understood by reference to the following detailed description of the invention and the accompanying drawings wherein.

DETAILED DESCRIPTION OF THE INVENTION

Figure 1:
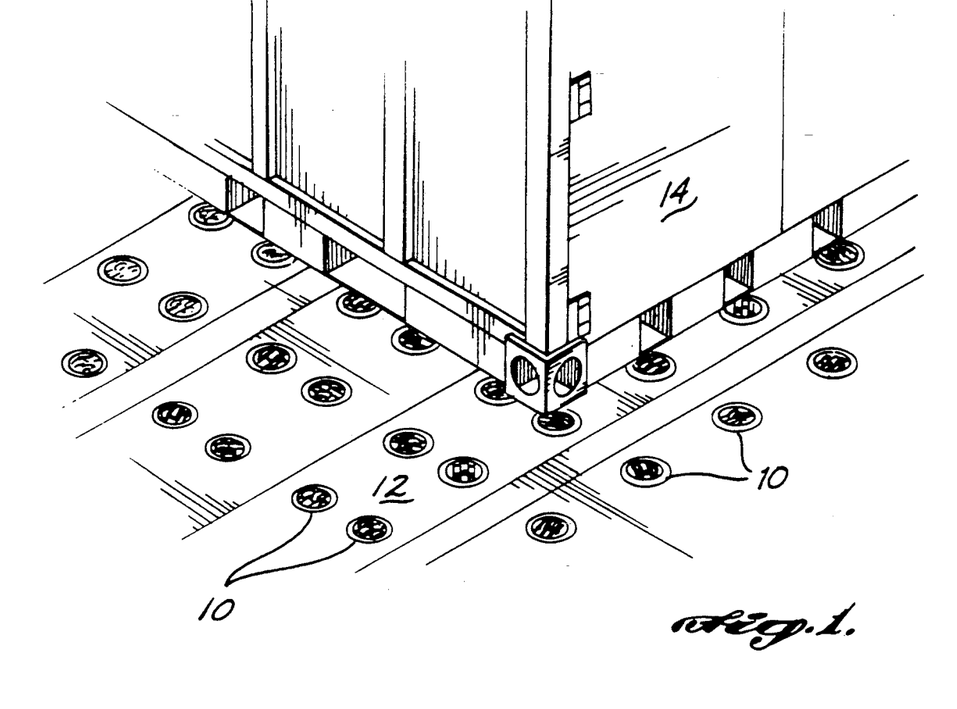
FIG. 1 is an environmental view of a main cargo deck of an airplane utilizing cargo cater assemblies made in accordance with the principles of the present invention.
Figure 2:
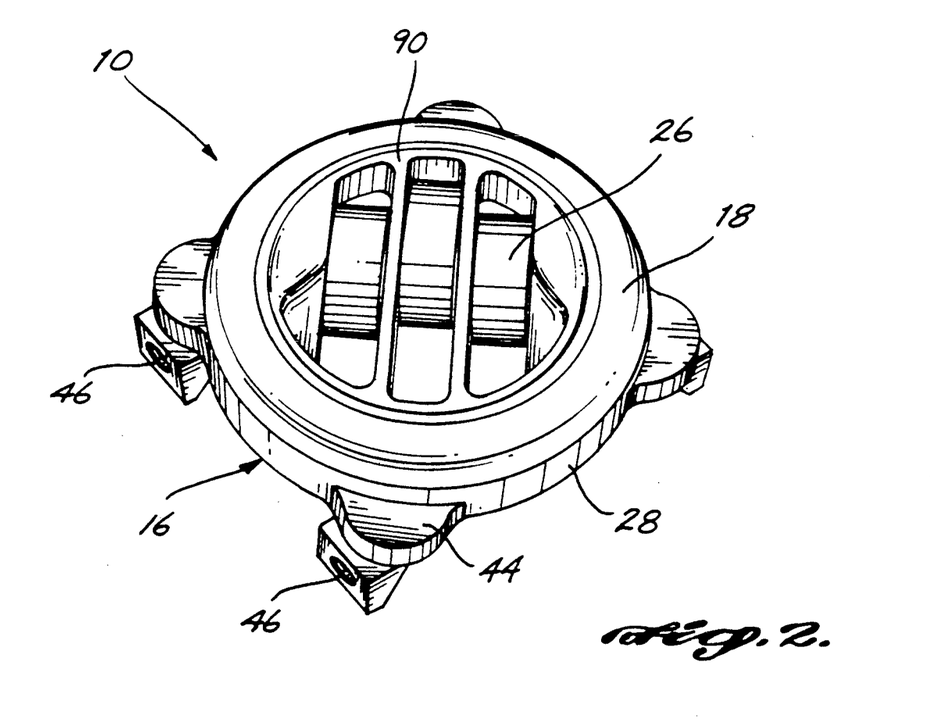
FIG. 2 is a perspective view of the cargo caster assembly of the present invention.

As illustrated in FIG. 1, a plurality of cargo caster assemblies 10 formed in accordance with the present invention may be employed in the main cargo deck 12 of a cargo airplane. The function of the cargo caster assemblies 10 is to facilitate the onboard movement of a cargo body 14, normally a loaded cargo container or pallet, by providing a roller plane above the surface of main cargo deck 12.

FIGS. 2, 3, 4, and 5 illustrate an embodiment of the cargo caster assembly 10, generally including a base part 16, a top part 18, bearings 20, and a roller assembly 22. The bearings 20 fit within a bearing raceway 24 formed by the base part 16 and top part 18 that allows top part 18 to fully and freely move relative to base part 16. The roller assembly 22 is fixedly attached to top part 18, so that the orientation of its rollers 26 may be varied by a full three hundred sixty degress.

Figure 5:
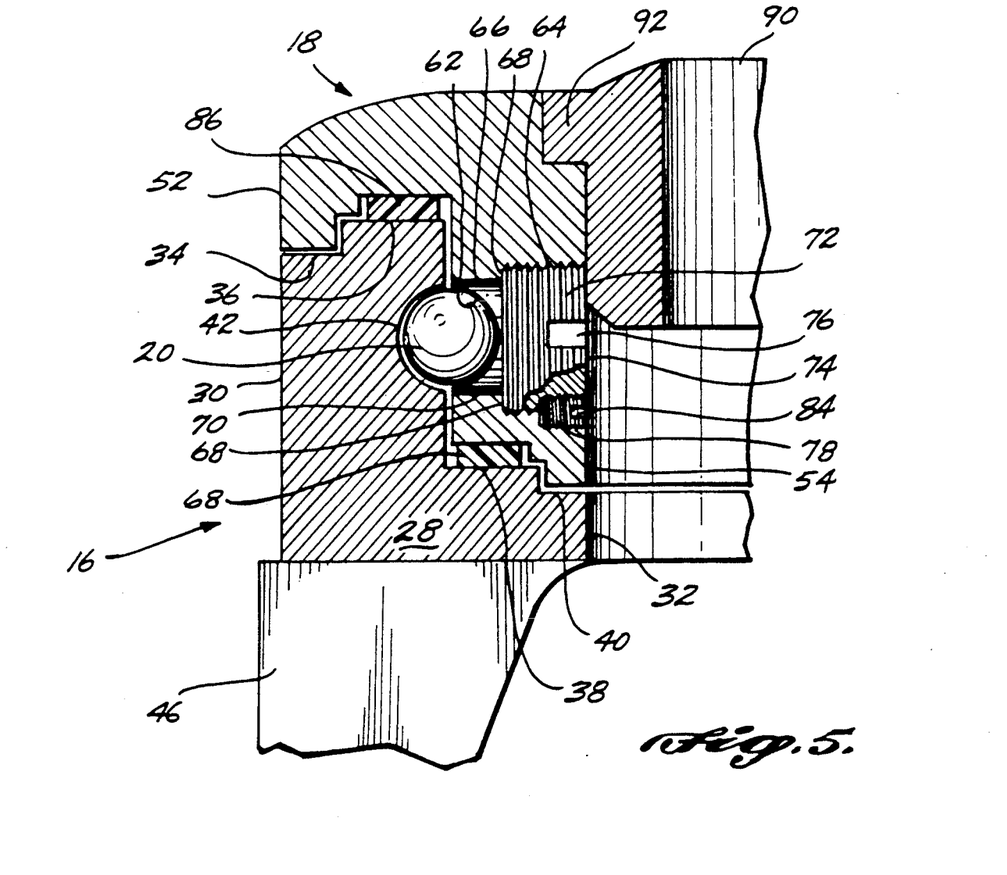
FIG. 5 is a cross-sectional view of the cargo caster assembly taken along line 5—5 of FIG. 4.

The base part 16 includes a circular ring portion 28 formed to have the stepped configuration shown in FIG. 5. Moving radially inward from an outside exposed surface 30 to an inside exposed surface 32 of ring portion 28, steps 34, 36, 38, and 40 are encountered. An outer race 42 is formed (e.g., machined) into the long vertical surface between step 36 and step 38. The outer race 42 is sized to substantially correspond to one-half of the diameter of a bearing 20.

The base part 16 also includes rounded extensions 44 extending radially outward from the ring portion 28 at four evenly-spaced locations. Integral with each rounded extension 44 is a downwardly extending mounting leg 46. While it is possible that the rounded extension 44 and the mounting leg 46 be separate parts connected by conventional methods, a more structurally sound base part 16 occurs if they are cast as a single piece. Each leg 46 includes a threaded attachment hole 48 leading to an internal cavity 50, which is open at its bottom (see FIG. 4). Thus, the base part 16 of cargo caster assembly 10 may be attached to existing cargo caster mounts through the use of a threaded bolt (not shown) extending from the mount. The threaded bolt is engageable with threaded hole 48 and is received within a correspondingly sized nut (not shown) disposed within internal cavity 50 of leg 46. Of course, it will be appreciated that these mounting aspects are matters of design detail and may be varied.

Figure 4:
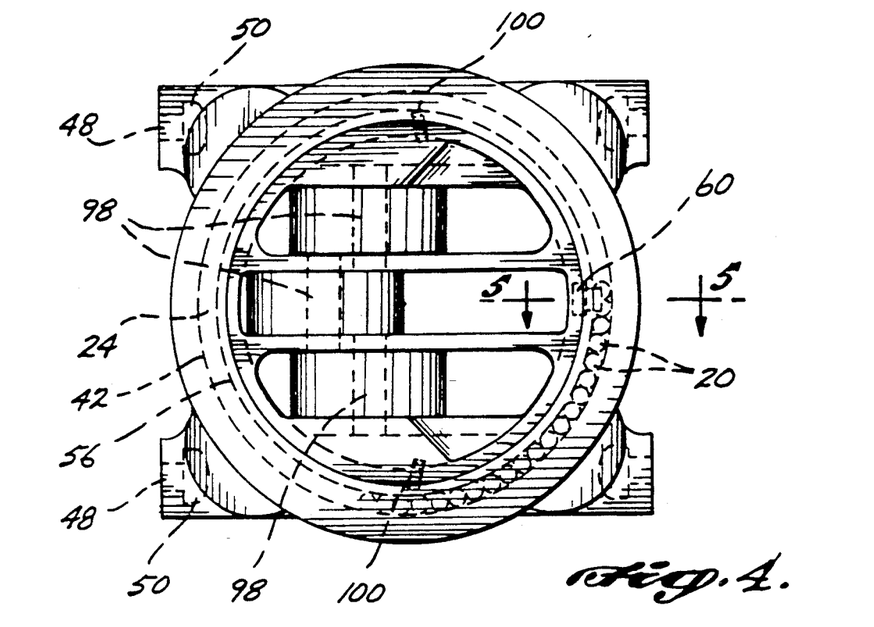
FIG. 4 is a top view of the cargo caster assembly shown in FIG. 2.

The top part 18 is of circular ring design and is formed to have the stepped configuration shown in FIG. 5. The steps of top part 18 are generally complimentary to steps 34, 36, 38, and 40 of base part 16. The top part 18 includes an outside exposed surface 52 and an inside exposed surface 54 generally aligned with the exposed surfaces 30 and 32 of base part 16. An inner race 56 is formed into the long central vertical surface of top part 18 at a position directly opposing outer race 42. The inner race 56 is also sized to substantially correspond to one-half of the diameter of a bearing 20. As shown in FIGS. 4 and 5, the inner race 56 and outer race 42 combine to form a bearing raceway 24 between base part 16 and top part 18 sized to receive bearings 20. On either side of the bearing raceway 24, the opposing surfaces of base part 16 and top part 18 overlap each other to form a labyrinth therebetween.

In the embodiment of the invention, the top part 18 includes a circular opening 58 extending from the inside exposed surface 54 to the inner race 56, whereby the bearings 20 may be inserted through the opening 58 into bearing raceway 24. A plug 60, having an inner surface 62 exposed in and substantially conforming to the contour of inner race 56, closes the opening 58 after the bearings 20 have been inserted. The opening 58 has interior threads 64 and an unthreaded reduced portion 66, which provides a shoulder 68 intermediate the length of the opening 58. The plug 60 has a reduced portion 70 extending into the reduced portion 66 of opening 58, on which inner surface 62 of plug 60 is provided. The plug 60 also has an enlarged threaded portion 72, engageable with interior threads 64, extending from its reduced portion 70 to the inside exposed surface 54. The configuration of opening 58 and plug 60 allows the plug to be threaded into opening 58 until the enlarged threaded portion 72 engages shoulder 68 to position the inner surface 62 of the plug flush with the surface of inner race 56. A flat outer surface 74 of the plug, located distal from inner surface 62, has a tool engaging recess 76 to facilitate the threaded insertion of the plug into opening 58.

To ensure that the inner surface 62 of plug 60 is flush with the surface of inner race 56, and that the bearing function is not impeded, an alignment mechanism is employed in the cargo caster assembly 10 of the present invention. The alignment mechanism includes a set screw 78, an upper threaded recess 80, and a lower threaded recess 82. The upper threaded recess 80 extends inwardly from the outer surface 74 of plug 60 into enlarged threaded portion 72 at a position near the outer perimeter of the plug. The lower threaded recess 82 extends inwardly from the inside exposed surface 54 into top part 18 at a position immediately adjacent the plug 60. The plug 60 and opening 58, and their threaded surfaces, are manufactured with tolerances sufficiently close that the upper threaded recess 80 and the lower threaded recess 82 are aligned to form a complete circular recess when the enlarged threaded portion 72 of plug 60 meets shoulder 68 of opening 58. This position of alignment also indicates that the inner surface 62 of plug 60 is flush with the surface of inner race 56. To maintain this alignment, set screw 78 is threaded into recesses 80 and 82 through engagement of a tool engaging recess 84 located in the outside end of set screw 78.

As shown in FIG. 5, the labyrinth design of base part 16 and top part 18 helps prevent dust and other contaminants from reaching the bearing raceway 24 and thereby impeding the free movement of the parts relative to one another. Because step 36 is at an elevation above step 34, dirt and contaminants potentially entering from the opening near the junction of outside exposed surfaces 30 and 52 must travel uphill to eventually reach the bearings 20. Similarly, step 38 is at an elevation above step 40, dirt and contaminants potentially entering from the opening near the junction of inside exposed surfaces 32 and 54 must also travel uphill to reach the bearings 20.

The labyrinth design of base part 16 and top part 18 alone should be sufficient to protect the bearing raceway 24 from dust and other contaminants. However, as a further precaution to keep bearing raceway 24 clean, dust seals 86 and 88 may be disposed on opposite sides of the bearing raceway. Dust seal 86 rests on step 36, while dust seal 88 rests on step 38 of base part 16. To accommodate the seals, space is provided between parts 16 and 18 at the steps 36 and 38. The dust seals 86 and 88 are preferably made of a resilient, yet slightly elastomeric, material and are configured as flat rings installed with lose tolerances, such that the seals do not make firm and continuous contact at their upper surfaces with the rotating top part 18.

The bearings 20 may be traditional spherical ball bearings of a diameter that substantially matches bearing raceway 24. If steel bearings are used, base part 16 and top part 18 must also be composed of steel to maintain the integrity of bearing raceway 24. However, in accordance with the present invention, it is preferable that the bearings 20 be comprised of a nonmetallic material in order that the base part 16 and the top part 18 may be composed of aluminum, thereby significantly reducing the weight of the cargo caster assembly 10. It has been found that if one or two fewer bearings 20 are inserted than it takes to completely fill the bearing raceway 24, better rotation of top part 18 relative to base part 16 is achieved.

The most preferred material of composition for bearings 20 is an acetal resin, which is a polyoxymethylene thermoplastic polymer. Acetal resins are dimensionally stable under exposure to moisture and heat, are resistant to chemicals and solvents, are resistant to flexing and creep, and have a low friction surface. These properties make acetal resins ideal as materials of composition for bearings. Further, such bearings may be produced at a cost that is a full order of magnitude lower than the cost of producing steel bearings, thereby drastically reducing initial cargo caster assembly production costs and subsequent bearing replacement costs. Commercially available forms of acetal resins contemplated for use in the manufacture of the bearings 20 include those marketed under the trade name Delrin, produced by E. I. duPont de Nemours and Company of Wilmington, Del., and under the trade name Celcon, produced by Celanese Chemical Company of New York, N.Y. While acetal resin is the most preferred material of composition, it will be appreciated by those skilled in the art that other materials of composition exemplifying some or all of those characteristics may also be used.

Figure 3:
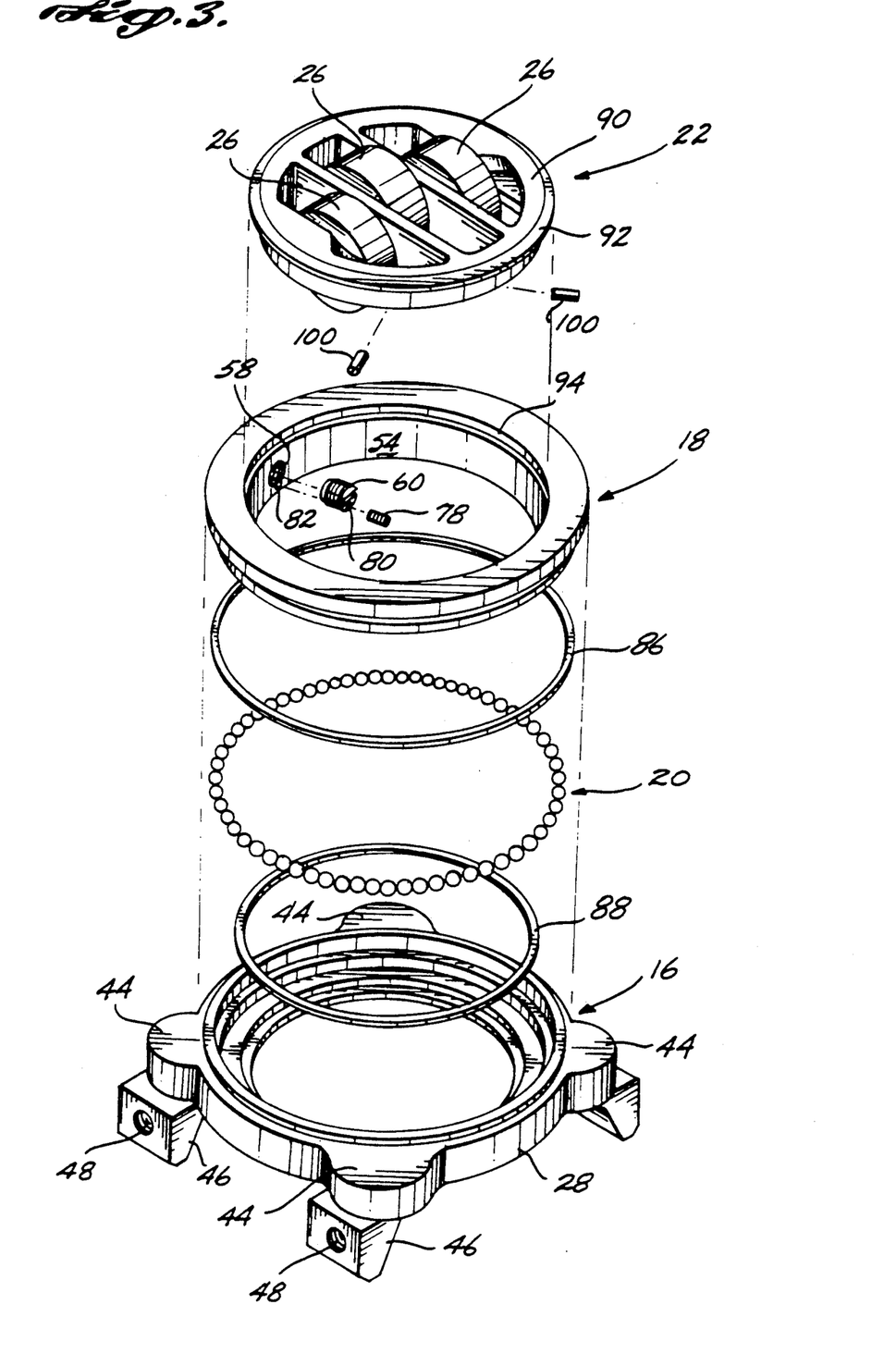
FIG. 3 is an exploded view of the cargo caster assembly shown in FIG. 2.

The roller assembly 22 includes a frame 90 of circular configuration, having a lip portion 92 extending radially outward around its upper circumference designed to engage a circular recess 94 formed in top part 18 (see FIGS. 3 and 5). The roller assembly 22 also includes rollers 26, which are supported by and are freely rotatable about axles 98 (see FIG. 4). To fixedly secure the roller assembly 22 to the top part 18, such that they will rotate in unison, set screws 100 may be threaded into a threaded recess (not shown) extending from the frame 90 into top part 18. It will be appreciated that roller assemblies of different design could be used in the cargo caster assembly 10 of the present invention, and that the one illustrated is for purposes of exemplification only.

Figure 6:
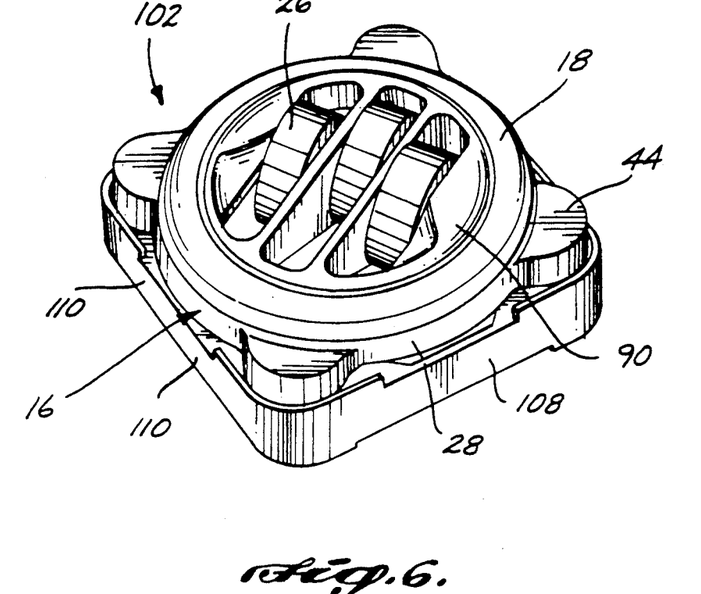
FIG. 6 is a perspective view of an attenuated alternative embodiment of the cargo caster assembly of the present invention.
Figure 7:
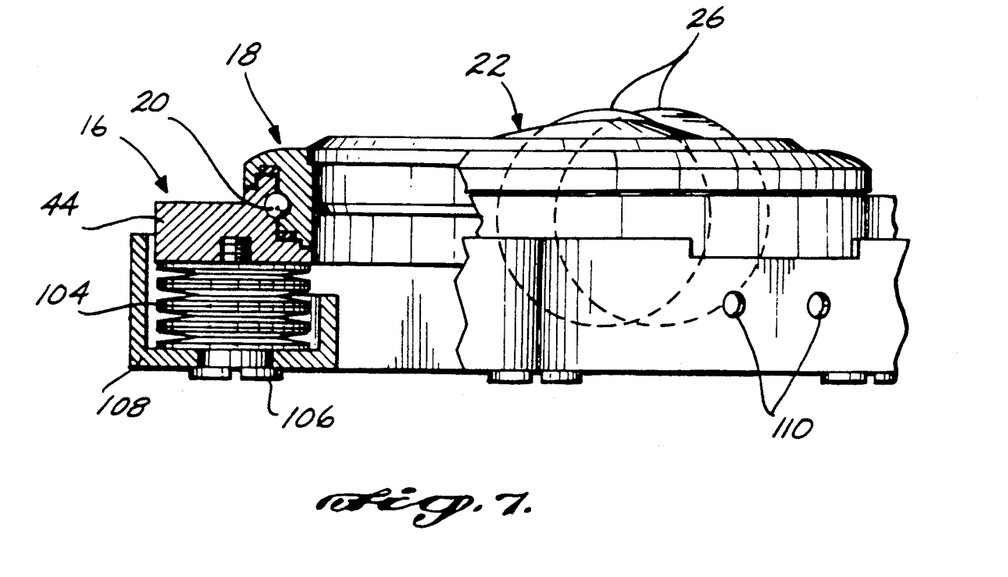
FIG. 7 is a partial cross-sectional view of the attenuated cargo caster assembly shown in FIG. 6.

An alternative embodiment showing an attenuated cargo caster assembly 102 is illustrated in FIGS. 6 and 7. This attenuation feature may be desirable where higher impact loads are exerted upon the caster assembles, as for instance in the nose section of a cargo airplane during the loading and unloading of cargo. The illustrated attenuated cargo caster assembly 102 is identical to cargo caster assembly 10 in terms of the top part 18, the bearings 20, and the roller assembly 22. The base part 16 is almost identical, expect that there are no mounting legs 46 structurally integral with rounded extensions 44. Instead, the attenuated cargo caster assembly 102 has a shock absorbing device such as a Belleville spring 104 interposed between each rounded extension 44 and the main cargo deck 12.

The Belleville spring 104 is held in place by screw 106, which extends through the center of the spring and is engageable with a threaded recess formed in the bottom of each rounded extension 44. A spring housing 108, protecting the Belleville springs 104, extends around the perimeter of the attenuated cargo caster assembly 102 and is also held in place by screw 106. Attachment holes 110 are provided in spring housing 108 for attaching attenuated cargo caster assembly 102 to existing mounts.

Figure 8:
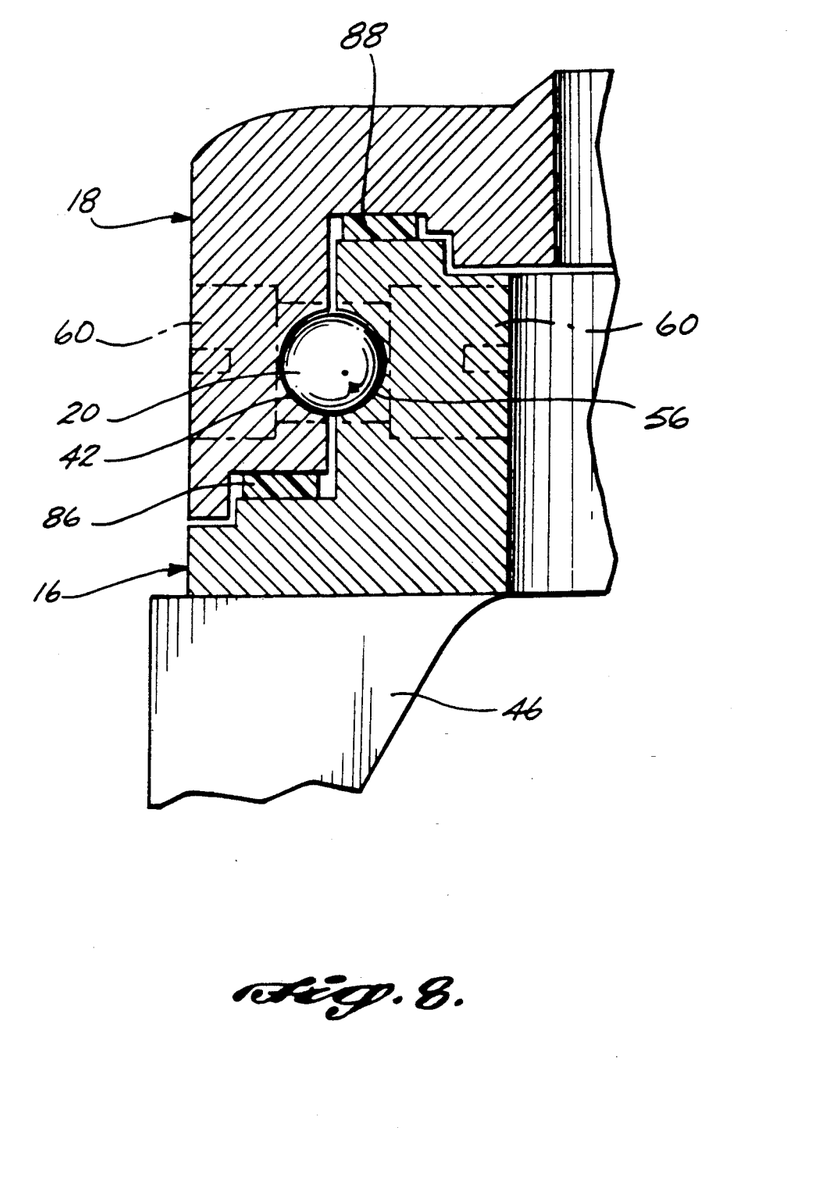
FIG. 8 is a schematic cross-section view, similar to FIG. 5, showing a potential reconfiguration of the cargo caster assembly of the present invention.

Referring to FIG. 8, it will be appreciated that the cargo caster assembly 10 of the present invention (and its attenuated version 102) may be reconfigured so that the outer race 42 is formed within the top part 18 and the inner race 56 is formed within the base part 16. Parts which are similar to identical to those described above have been given the same reference numerals. Additionally, as shown in phantom, the opening 58 and the plug 60 may extend to the bearing raceway 24 from either an inside or outside exposed surface. However, it is advantageous that the opening and plug be situated radially inward of the bearing raceway so as to be within the protective confines of the interior portion of the caster assembly. Furthermore, as illustrated, the top part 18 and the roller assembly 22, may be combined into a single piece.

While preferred embodiments of the present invention have been illustrated and described, it should be understood that variations could be made therein without departing from the spirit and scope of the invention. Accordingly, it is to be understood that the invention is not to be limited to the specific embodiments illustrated and described. Rather, the true scope and spirit of the invention is to be determined by referenced to the following claims.

I claim:

1. A bearing assembly having two parts movable relative to one another, the bearing assembly comprising:
    a first part having a second race for receiving bearings therein;
    a second part having a second race for receiving bearings therein, said second race opposing said first race in said first part to form a bearing raceway;
    a plurality of bearings in said bearing raceway;
    said first and second parts having opposing proximately disposed surfaces overlapping each other in a stepped configuration on opposite sides of said bearing raceway;
    at least one of said parts having an exposed surface not overlapped by a surface of the other of said parts;
    an opening extending from said exposed surface to one of said races, whereby bearings may be inserted through said opening into said bearing raceway; and
    means for closing said opening after said bearings have been inserted, said means for closing said opening comprising a plug having an inner surface exposed in and substantially confirming to the contour of the race in which said opening terminates, and having an outer surface on the opposite end thereof;
    said opening having a reduced portion providing a shoulder intermediate the length of the opening;
    said plug having a reduced portion extending into said reduced portion of said opening;

said inner surface of said plug being located on the end of said reduced portion of said plug;

said plug having an enlarged threaded portion extending from its reduced portion to its outer surface;

said opening being provided with interior threads engageable with said enlarged threaded portion of said plug;

whereby said plug may be threaded into said opening until said enlarged portion of said plug engages said shoulder to position said inner surface of said plug so that said inner surface will be flush with the surface of the race in which said inner surface is exposed.

2. The bearing assembly of claim 1, wherein:

said enlarged threaded portion of said plug has a threaded recess extending inwardly from said outer surface of said plug;

said exposed surface of said one of said parts has a threaded recess extending into said one of said parts; and including a set screw engageable in said threaded recesses when they are aligned to ensure that said inner surface of said plug remains flush with the surface of the race in which said inner surface is exposed.

3. The bearing assembly of claim 1, further comprising a seal disposed between said overlapping surfaces on at least one side of said bearing raceway.

4. The bearing assembly of claim 3, further comprising first and second seals, one of said seals disposed between said overlapping surfaces on one side of said bearing raceway and the other of said seals disposed between said overlapping surfaces on the other side of said bearing raceway.

5. The bearing assembly of claim 1, wherein said first and second parts are comprised of a metallic material and said bearings are composed of a nonmetallic material.

6. The bearing assembly of claim 5, wherein said bearings are composed of an acetal resin.

7. A bearing assembly having two parts movable relative to one another, the bearing assembly comprising:

a first part having a first race for receiving bearings therein;

a second part having a second race for receiving bearings therein, said second race opposing said first race in said first part to form a bearing raceway;

a plurality of bearings in said bearing raceway;

said first and second parts having surfaces overlapping each other on opposite sides of said bearing raceway;

at least one of said parts having an exposed surface not overlapped by a surface of the other of said parts;

an opening extending from said exposed surface to one of said races, whereby bearings may be inserted through said opening into said bearing raceway;

a plug for closing said opening after said bearings have been inserted, said plug having an inner surface exposed in and substantially confirming to the contour of the race in which said opening terminates, and having an outer surface on the opposite end thereof; and a set screw;

said opening having a reduced portion providing a shoulder intermediate the length of the opening, said plug having a reduced portion, on the end of which is provided said inner surface, extending into said reduced portion of said opening, said plug having an enlarged threaded portion extending from its reduced portion to its outer surface, said opening being provided with interior threads engageable with said enlarged threaded portion of said plug, whereby said plug may be threaded into said opening until said enlarged portion of said plug engages said shoulder to position said inner surface of said plug so that said inner surface will be flush with the surface of the race in which said inner surface is exposed;

said enlarged portion of said plug having a threaded recess extending inwardly from said outer surface of said plug, said exposed surface of said one of said parts having a threaded recess extending into said one of said parts, whereby said set screw is engageable in said threaded recesses when they are aligned to ensure that said inner surface of said plug remains flush with the surface of the race in which said inner surface is exposed.

8. A caster bearing assembly attachable to a surface for facilitating the movement of a body along a roller plane located above the surface, the caster bearing assembly comprising:

a base part having a first race for receiving bearings therein and including means for attaching it to a surface;

a top part having a second race for receiving bearings therein, said second race opposing said first race in said base part to form a bearing raceway;

a plurality of bearings in said bearing raceway;

said base part and said top part having surfaces overlapping each other on opposite sides of said bearing raceway;

at least one of said parts having an exposed surface not overlapped by a surface of the other of said parts;

an opening extending from said exposed surface to one of said races, whereby bearings may be inserted through said opening into said bearing raceway so that said top part may move relative to said base part;

a plug for closing said opening after said bearings have been inserted, said plug having an inner surface exposed in and substantially conforming to the contour of the race in which said opening terminates, and having an outer surface on the opposite end thereof;

a set screw; and rollers mounted on said top part for providing a roller plane over which a body is moved;

said opening having a reduced portion providing a shoulder intermediate the length of the opening, said plug having a reduced portion, on the end of which is provided said inner surface, extending into said reduced portion of said opening, said plug having an enlarged threaded portion extending from its reduced portion to its outer surface, said opening being provided with interior threads engageable with said enlarged threaded portion of said plug, whereby said plug may be threaded into said opening until said enlarged portion of said plug engages said shoulder to position said inner surface of said plug so that said inner surface will be flush with the surface of the race in which said inner surface is exposed;

said enlarged portion of said plug having a threaded recess extending inwardly from said outer surface of said plug, said exposed surface of said one of said parts having a threaded recess extending into said one of said parts, whereby said set screw is engageable in said threaded recesses when they are aligned to ensure that said inner surface of said plug remains flush with the surface of the race in which said inner surface is exposed.

9. A caster bearing assembly attachable to a surface for facilitating the movement of a body along a roller plane located above the surface, the caster bearing assembly comprising:

a base part having a first race for receiving bearings therein and including means for attaching it to a surface;

a top part having a second race for receiving bearings therein, said second race opposing said first race in said base part to form a bearing raceway;

a plurality of bearings in said bearing raceway;

said base part and said top part having opposing proximately disposed surfaces overlapping each other in a stepped configuration on opposite sides of said bearing raceway;

at least one of said parts having an exposed surface not overlapped by a surface of the other of said parts;

an opening extending from said exposed surface to one of said races, whereby bearings may be inserted through said opening into said bearing raceway so that said top part may move relative to said base part;

means for closing said opening after said bearings have been inserted; and rollers mounted on said top part for providing a roller plane over which a body is moved.

10. The caster bearing assembly of claim 9, wherein said attaching means includes shock absorbing means interposed between said base part and the surface.

11. The caster bearing assembly of claim 9, wherein said first race is the outer race and said second race is the inner race.

12. The caster bearing assembly of claim 9, wherein said first race is the inner race and said second race is the outer race.

13. The caster bearing assembly of claim 9, wherein said rollers are mounted to a roller assembly which is in turn mounted to said top part.

14. The caster bearing assembly of claim 9, wherein said means for closing said opening comprises a plug having an inner surface exposed in and substantially confirming to the contour of the race in which said opening terminates, and having an outer surface on the opposite end thereof.

15. The caster bearing assembly of claim 14, wherein:

said opening has a reduced portion providing a shoulder intermediate the length of the opening;

said plug has a reduced portion extending into said reduced portion of said opening;

said inner surface of said plug being provided on the end of said reduced portion of said plug;

said plug has an enlarged threaded portion extending from its reduced portion to its outer surface;

said opening being provided with interior threads engageable with said enlarged threaded portion of said plug; and whereby said plug may be threaded into said opening until said enlarged portion of said plug engages said shoulder to position said inner surface of said plug so that said inner surface will be flush with the surface of the race in which said inner surface is exposed.

16. The caster bearing assembly of claim 15, wherein:

said enlarged threaded portion of said plug has a threaded recess extending inwardly from said outer surface of said plug;

said exposed surface of said one of said one of said parts has a threaded recess extending into said one of said parts; and including a set screw engageable in said threaded recesses when they are aligned to ensure that said inner surface of said plug remains flush with the surface of the race in which said inner surface is exposed.

17. The caster bearing assembly of claim 9 further comprising a seal disposed between said overlapping surfaces on at least one side of said bearing raceway.

18. The caster bearing assembly of claim 17, further comprising first and second seals, one of said seals disposed between said overlapping surfaces on one side of said bearing raceway and the other of said seals disposed between said overlapping surfaces on the other side of said bearing raceway.

* * * * *

UNITED STATES PATENT AND TRADEMARK OFFICE
CERTIFICATE OF CORRECTION

PATENT NO. : 5,097,565
DATED : March 24, 1992
INVENTOR(S) : Thomas H. Shorey

It is certified that error appears in the above-identified patent and that said Letters Patent is hereby corrected as shown below:

| COLUMN | LINE | |
|---|---|---|
| 1 | 5 | "elates" should read --relates-- |
| 1 | 37 | "process" should read --processes-- |
| 2 | 1 | "separating" should read --separation-- |
| 2 | 38 | "closing" should read --sealing-- |
| 2 | 50 | "cater" should read --caster-- |
| 2 | 66 | "cross-section" should read --cross-sectional-- |
| 3 | 20 | "degress" should read --degrees-- |
| 3 | 66 | "In the embodiment" should read --In this embodiment-- |
| 5 | 1 | "lose" should read --loose-- |
| 5 | 10 | "comprised" should read --composed-- |
| 5 | 39 | "those" should read --these-- |
| 5 | 57, 58 | "assem-bles" should read --assemblies-- |
| 5 | 63 | "expect" should read --except-- |
| 6 | 34 | "referenced" should read --reference-- |

UNITED STATES PATENT AND TRADEMARK OFFICE
CERTIFICATE OF CORRECTION

PATENT NO. : 5,097,565
DATED : March 24, 1992
INVENTOR(S) : Thomas H. Shorey It is certified that error appears in the above-identified patent and that said Letters Patent is hereby corrected as shown below:

| COLUMN | LINE | |
|---|---|---|
| 6 | 40 | "second" should read --first-- |
| 6 | 61 | "confirming" should read --conforming |
| 7 | 37 | "comprised" should read --composed-- |
| 7 | 64 | "confirming" should read -- conforming-- |
| 8 | 16 | after "enlarged" insert --threaded-- |
| 9 | 3 | after "enlarged" insert --threaded-- |
| 10 | 7 | "confirming" should read --conforming-- |

Signed and Sealed this

Sixth Day of July, 1993

MICHAEL K. KIRK

Attest:

*Attesting Officer*      Acting Commissioner of Patents and Trademarks